May 20, 1924.

G. R. WATSON

DEVICE FOR SHAPING DRILLS

Filed Jan. 8, 1923

1,495,051

Inventor

George R. Watson

By G. C. Kennedy

Attorney

Patented May 20, 1924.

1,495,051

UNITED STATES PATENT OFFICE.

GEORGE R. WATSON, OF WATERLOO, IOWA, ASSIGNOR TO ARMSTRONG MANUFACTURING COMPANY, OF WATERLOO, IOWA.

DEVICE FOR SHAPING DRILLS.

Application filed January 8, 1923. Serial No. 611,329.

*To all whom it may concern:*

Be it known that I, GEORGE R. WATSON, a citizen of the United States of America, and a resident of Waterloo, Black Hawk County, Iowa, have invented certain new and useful Improvements in Devices for Shaping Drills, of which the following is a specification.

My invention relates to improvements in devices for shaping drills, and the object of my improvement is to supply means for shaping or reshaping the cutter end or bits of a drill to render and renew the tool for continued and most efficient service.

Figure 1:
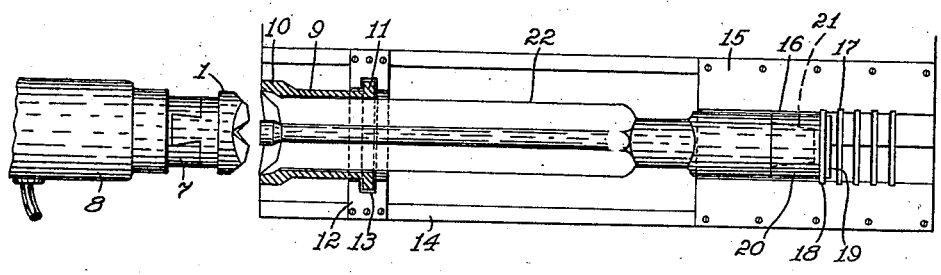
Figure 2:
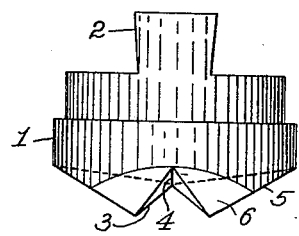
Figure 4:
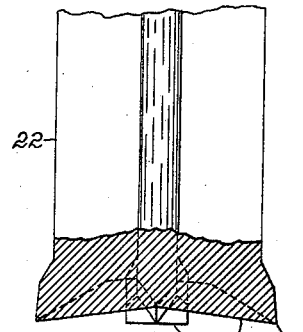
Figure 3:
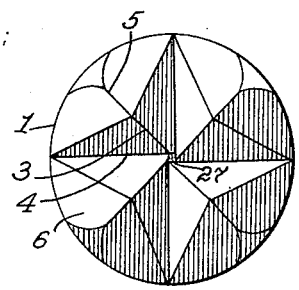
Figure 5:
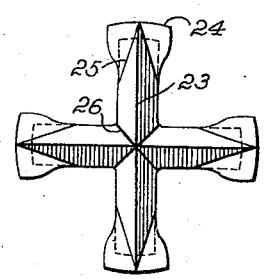

I have accomplished this object by the means which are hereinafter described and claimed, and which are illustrated in the accompanying drawing, in which Fig. 1 is a plan view of a drill mounted to be operated upon by my improved shaping means, with parts sectioned or broken away. Fig. 2 is an elevation of the die for shaping the cutting end of the drill, and Fig. 3 is a plan of the shaping end of said die. Fig. 4 is a fragmental elevation of the cutting terminal part of said drill, with part sectioned away, and Fig. 5 is a plan of the cutting end of the drill.

The drill shown in the drawings forms no part of this invention, as a concurrent application for patent has been filed thereon. This drill, however, has a cruciform shank 22 with a threaded boss 21 at one end, of frustal shape, and which is inserted into a like shaped socket in a block 20 before the drill is operated upon, in order to prevent injuries to the threads.

At the other end of the shank 22 the ends of the longitudinal ribs are circumferentially widened to provide bits 24, and from the middles of the bits the anticlinal transverse or radial cutters 23 extend to the axis of the drill, meeting at their troughs or roots 26. These cutters also at their outer ends preferably meet the inner sloping faces of the bits 24 along the roots 25, so that pulverized material is forced between the longitudinal ribs from the sloping surfaces of the bits and said cutters.

To primarily shape this cutting end of the drill 22, I provide a die 1 having a wedging shank 2 to be seated in a holder slide 7, and the latter is mounted to reciprocate in a housing 8 being that of a pneumatic motor. This die may, however, be reciprocated by any other suitable means.

The drill blank is supported removably longitudinally in line with the die 1 on a rigid holder or base having spaced longitudinal beams 14. A thick plate 15 is secured upon one end part of said base, and has a medial longitudinal upwardly opening V-shaped groove 16 in which is laid the shank end of the drill. A number of equally spaced transverse slots 17 are provided in the plate 15 across the groove 16 to removably receive a rectangular piece of metal, shown at 18 as contacting with the end of the drill to serve as an adjustable stop therefor. This piece or stop 18 may have a V-shaped projection 19 on one face, which fits the groove 16, and when the piece or stop 18 is reversed, may serve in halving adjustably the interspaces of the slots 17 in effecting the said adjustments.

The forward or cutter end part of the drill is inserted in and supported by a hollow cylindric carrier 9, whose forward end is widened slopingly outwardly to shape the offset parts of the drill bits 24, the forward ends of said carrier and drill being coterminous. The body of the carrier closely fits the ribs of the drill. The other end of the carrier has an exterior fillet 11.

The numeral 12 denotes a downwardly bowed or semi-circular body whose ends are secured to the opposite beams 14, and this body has a semi-circular groove 13 to receive the fillet 11, and thus serves as a support for the carrier 9 and also as a stop or means for preventing rearward movement thereof, or escape thereof forwardly.

The die 1 has its working end shaped appropriately to shape and fit the end of the drill shown in said Fig. 5, and is operated in a well-known way by rapid oscillation of the die against the heated and suitably plastic end of the drill to shape the cutting end of the latter, or to reshape it when worn and needing repair.

The die face has the opposed pairs of anticlinal faces arranged in a cross, with the inclined ridges 3 and roots 4 to shape the anticlinal transverse cutters 23 of the drill.

The spaces at opposite sides of the outer radial angles 5 as shown at 6 are in the same plane.

Referring again to said Fig. 3, it will be seen that said ridges 3 meet centrally at points a little offset from the axis of the die at 27. This is important in practice in the shaping or the reshaping of the cutters 23 of the drill. As the root or trough 4 of the die is relatively deep and narrow where the sides converge, it is usually the case that the metal of the drill end when heated is not sufficiently plastic or flowable to completely enter the root so as to form a perfect cutter edge 23. The cutter edge will be somewhat blunt or rounded. To prevent this I have offset the die edges or angles 3 slightly. The die is then used upon the drill end, then is rotated successively in fourths of a rotation by any suitable appliance. The working of the die upon the drill end because of the offsetting of the angles of the die at 3 causes a perfected shaping of the cutter parts 23 on the drill, as each rotational shift of the drill brings into play on the slightly deformed ridge 23 another part of the die which reshapes the deformed part until the cutters are thus finally shaped to accurate cutting edges.

It is obvious that the shape of the die face may be varied to produce a varied type of drill end, without departing from the scope of the invention.

Having described my invention, what I claim as new, and desire to secure by Letters Patent, is:

1. A die for shaping the cutter face of a drill, said die provided with shaping angular projections meeting each other centrally at points slightly separated from the axis of the die therearound, a supporting structure having a semi-annular transverse groove, and a shaping sleeve to receive a drill, having an annular flange to detachably engage said transverse groove.

2. In combination, an oscillatory die-head, spaced standards, a longitudinally grooved plate fixed across the rear part of the top of said standards and having a plurality of transverse slots intersecting said groove, an offset stop removably insertable in any of said slots, another plate fixed across the forward part of the top of said standards and having a semi-annular groove positioned transversely across it with axis alined with the said longitudinal groove, a sleeve having an exterior annular rib removably fitting said semi-annular groove and having at its forward end an offset shoulder in its inner wall, said die-head and said sleeve cooperating in the formation upon a drill seated in the sleeve and in said longitudinally grooved plate a drill-head having a cutting terminal and a shoulder therearound.

Signed at Waterloo, Iowa, this 6th day of December, 1922.

GEORGE R. WATSON.